United States Patent [19]

Sweeney

[11] 3,961,772
[45] June 8, 1976

[54] CONTROL SYSTEM FOR POSITIONING EXTENSIBLE PIPELINE SYSTEM

[75] Inventor: William T. Sweeney, Ponca City, Okla.

[73] Assignee: Continental Oil Company, Ponca City, Okla.

[22] Filed: Nov. 4, 1974

[21] Appl. No.: 520,312

[52] U.S. Cl. .................. 254/173 R; 137/355.16
[51] Int. Cl.² ................................. B66D 1/48
[58] Field of Search.......... 254/172, 173 R; 302/14; 137/344, 355.16; 299/18

[56] References Cited
UNITED STATES PATENTS

| | | | |
|---|---|---|---|
| 2,603,428 | 7/1952 | Newcombe | 254/173 R |
| 2,804,498 | 8/1957 | Touton | 137/344 |
| 3,638,781 | 2/1972 | Heywood | 254/172 X |
| 3,868,964 | 3/1975 | Tarter | 302/14 |

Primary Examiner—M. H. Wood, Jr.
Assistant Examiner—John A. Pekar
Attorney, Agent, or Firm—William J. Miller

[57] ABSTRACT

A control system for use in controlling the positioning of a continuous hydraulic pipeline system of extensible type. The system includes automatic control apparatus responsive to pipeline or hydraulic transport position sensing apparatus which functions to maintain the pipeline apparatus in proper position automatically during operation. The control system is particulaly adapted for use in controlling position and tension in hose hauler vehicles for coal slurry transport in automatic mining operations, and serves to continually sense tension in the slack loop of the hose hauler vehicle to maintain the tension within predetermined limits thereby assuring proper positioning of the entire hose hauler vehicle and machinery train.

9 Claims, 5 Drawing Figures

CONTROL SYSTEM FOR POSITIONING EXTENSIBLE PIPELINE SYSTEM

BACKGROUND OF THE INVENTION

1. Field of the Invention

The invention relates generally to tension responsive position maintenance apparatus and, more particularly, but not by way of limitation, it relates to a control system for maintaining proper position and tensioning of a slurry line hose hauler vehicle as employed in automatic mining operations.

2. Description of the Prior Art

The prior art includes various types of automatic mining operation as well as the various forms of machinery which contribute to such capability. A particular prior art illustration of such mining approach is to be found in the U.S. Pat. No. 3,260,548 in the name of Reichl which illustrates a basic form of automatic coal mining machine connected through a slurry hose system to a central terminal or disposition point. Various other teachings in the past have set forth apparatus for automatic transportation of mined material from the mine face and digging machine to a disposal terminal via hose systems, conveyors and the like; however, to the inventor's knowledge there has never been a wheeled hydraulic hose vehicle system proposed which was completely automatically controllable as to effective length, i.e. mine face to disposal terminal, and which could be left unattended thereby to eliminate the need for one more attendant in the mining operations area.

SUMMARY OF THE INVENTION

The present invention relates to an automatic control system for use in an extensible pipeline system of the wheeled vehicle type which continually senses tension of a 180° slack loop in the wheeled vehicle or hydraulic hose hauler vehicle to maintain proper positioning of the loop and therefore the overall extension of the pipeline from source to disposal terminal. The control system utilizes a force transducer connected between an automatically controlled winch and a slack loop vehicle to sense increased and decreased force in response to which the winch is driven reversibly in one direction or the other to maintain cable tension within predetermined limits and, therefore, proper positioning of the slack loop vehicle.

Therefore, it is an object of the present invention to provide an automatic control system for controlling tension of a slurry line hydraulic hose hauler vehicle.

It is yet another object of the present invention to provide automatic control of a hydraulic hose hauler vehicle throughout circuitous mine tunneling.

It is still another object of the present invention to provide an automatic control system responsive to a plurality of force transducers which are effective not only to control position and tension of the hydraulic hose hauler vehicle but to effect automatic alarm and shutdown upon sensing of error functions along the hauler vehicle route.

Finally, it is an object of the present invention to provide automatic control of pipeline slurry systems thereby to reduce the workforce requirements and attendant risks in a mining area.

Other objects and advantages of the invention will be evident from the following detailed description when read in conjunction with the accompanying drawings which illustrate the invention.

DETAILED DESCRIPTION OF THE INVENTION

Figure 1:
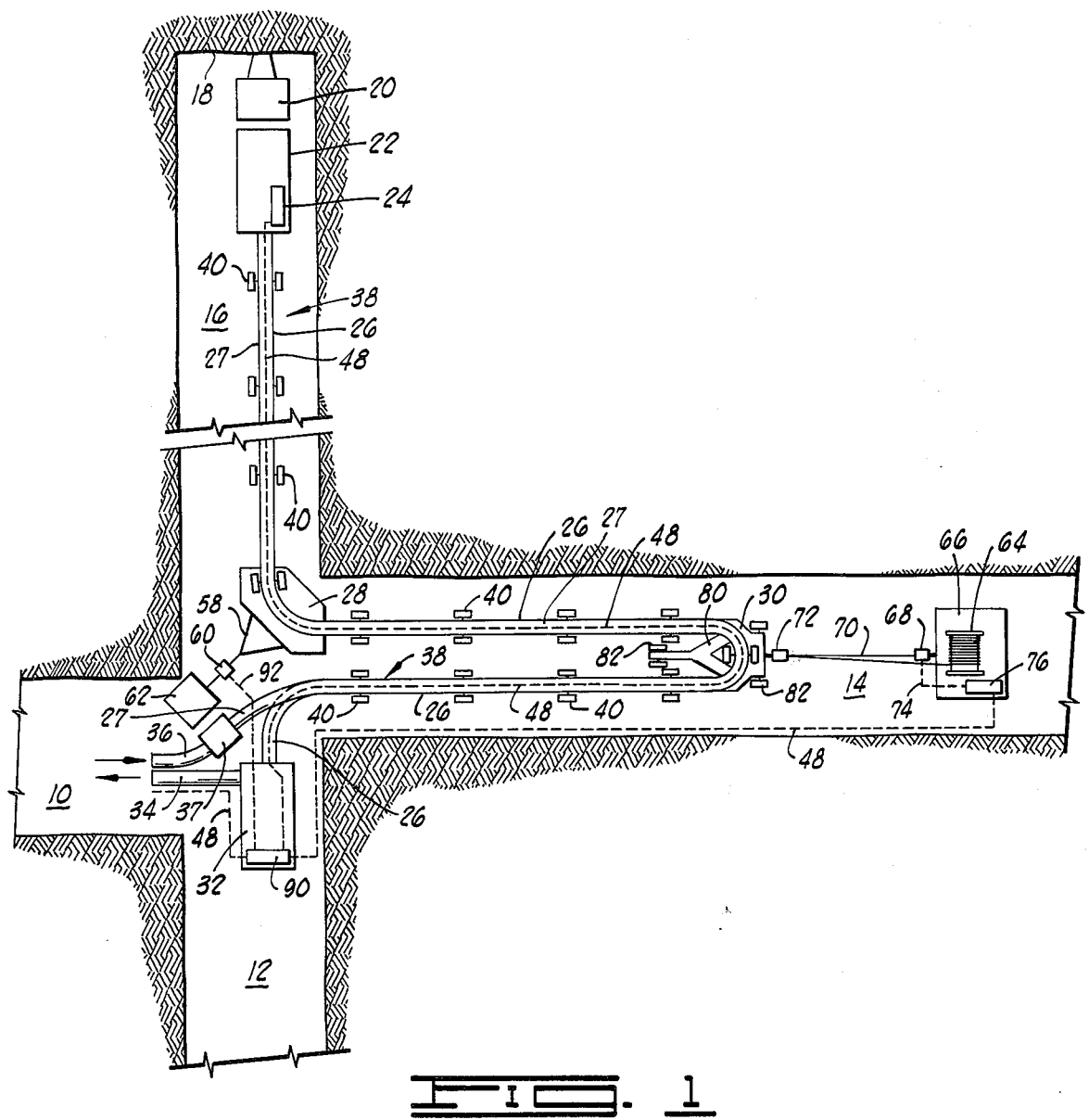
FIG. 1 is a schematic plan view of a section of mine tunnel showing an automatic mining scheme and control system as constructed in accordance with the present invention.

Referring now to FIG. 1, an automated mining system is shown in a representative operational layout within a mine passageway configuration consisting of a tunnel 10, entry ways 12 and 14, and a room 16 which terminates at mine face 18. The portion of mine plan is more representative of the room and pillar type of mining scheme; however, it should be understood that the present invention is equally applicable to long wall mining practices.

Coal is removed from mine face 18 by means of a mining machine 20, which may be of conventional type, whereupon the mined coal is passed to the injection pump vehicle 22 for slurry processing. The mining machine 20 may be one of various conventional types. The injection pump vehicle 22 might include conventional equipment including crusher of well-known type, water hopper and injection pump equipment for preparing the coal slurry for forced transportation. Injection pump vehicle 22 also includes an operator's console 24 which constitutes the main operating position of the automatic control system of the present invention.

The prepared coal slurry at injection pump vehicle 22 is then carried by means of pump injection through a slurry line 26 underlying a return water line 27 (See FIG. 2), as will be further described below. The slurry line 26 (and water line) then follow a tortuous circuit around a corner turn assembly 28 and around a slack loop including a 180° turn vehicle 30 to a booster pump station 32 whereupon the circuit proceeds on through tunnel 10 utilizing an outgoing slurry pipeline 34. Returning water moves via return pipeline 36 to connector station 37 and finally the return water hose or line 27.

The slurry line 26 and water line 27 each consist of a hydraulic hose, preferably a reinforced type, and they are carried in rigid positioning on a multi-wheeled hydraulic hose hauler vehicle, hereinafter referred to as HHV. A portion of the structure is shown in greater detail in FIG. 2. The slurry line 26 and water line 27 are carried by the HHV 38 in over/under relationship. HHV 38 includes a multiple of wheels 40 periodically axially affixed to selected ones of links 42 which are serially pivotally connected by means of vertically disposed pivot members 44. Selected links 42a carry dual hose clamps 46 thereon in rigid affixure to maintain the slurry hose 26 and water hose 27 in secure positioning.

Some structural specifics of the HHV 38 are set forth in a separate co-pending U.S. patent application Ser. No. 298,691 as filed on Oct. 18, 1972 and entitled "Linkage Geometry for a Slurry System". However, it should be understood that other forerunner types of inner hose hauler vehicle may be employed for use under control of the present invention; such as, for example, the structure disclosed in U.S. patent application Ser. No. 389,273 filed on Aug. 21, 1973 entitled "A Mobile Slurry Handling System".

Figure 2:
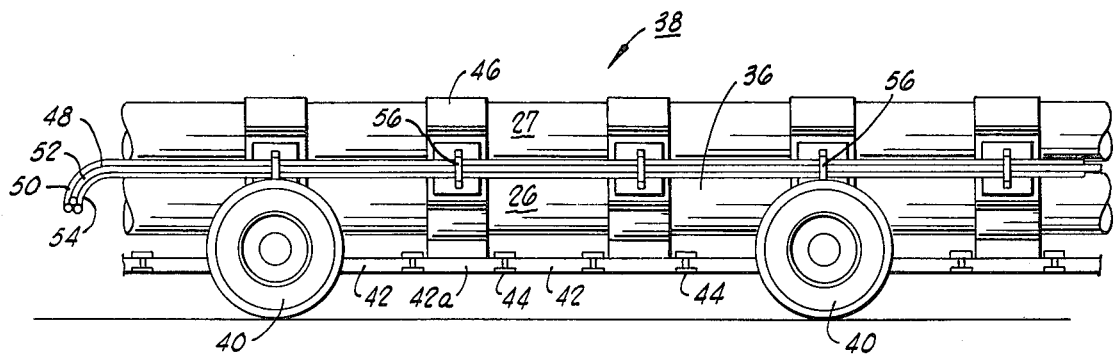
FIG. 2 is a side elevation of a section of hydraulic hose hauler vehicle as may be utilized in the present invention.

Referring to both FIGS. 1 and 2, a control link 48 providing energy communication between control points of the system may be carried in secure affixure along the HHV 38, e.g. on top or alongside as shown. Thus, as shown in FIG. 2, link 48, consisting of a pneumatic line 50, electric cable 52 and auxiliary hydraulic line 54 may be secured by means of suitable cable brackets 56 along the sides of the clamps 46. While three conduits or hoses 52–54 are shown in FIG. 2, it should be understood that this number may well be varied by the exigencies of the particular mining installation and mode of operation, and all manner of auxiliary control lines may be run alongside the HHV 38.

The HHV, bearing slurry line 26 and water line 27, leads from injection pump vehicle 22 around turn assembly 28 which constitutes an assembly anchored to the mine floor in suitable manner to provide ease of turning at proper radius for the HHV 38. As shown, turn assembly 28 is retained by a cable connection 58 connected through a remote indicating force transducer 60 to a suitable anchor 62, e.g. floor jacks or other well known mine anchoring fixtures. A suitable form of turn assembly 28 may be such as that disclosed in the co-pending U.S. patent application Ser. No. 470,068 as filed on May 15, 1974 and entitled "Turning Conveyor for a Flexible Hose Supporting System".

The HHV 38 is then led into a slack loop within entry way 14 and around a mobile 180° turn vehicle 30 for purposes of taking up any slack in the slurry line 26 and water line 27 (the HHV) as mining machine 20 and injection pump vehicle 22 move during their operation. Mobility of 180° turn vehicle 30 is effected by a reversibly driven winch 64 suitably anchored to the mine floor by means of anchor platform 66, and as connected through a force transducer 68 and cable 70, as led over a pulley 72. The force transducer 68 is connected via a conductor linkage 74 to a control assembly 76 which is also in connection with the system link 48, as will be further described.

Figure 3:
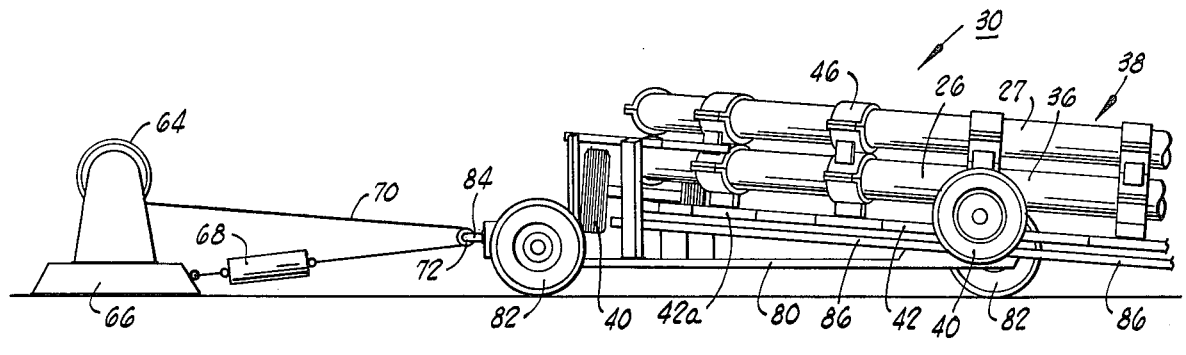
FIG. 3 is a side elevation of a 180° turn vehicle and winch assembly as utilized in the present invention.

A particular type of 180° turn vehicle, as shown in greater detail in FIG. 3, is the subject matter of U. S. patent application Ser. No. 463,222 as filed on Apr. 23, 1974 and entitled "Conveyor for Flexible Slurry Hose".

As shown in FIG. 3, the 180° turn vehicle 30 consists of a mobile platform 80 movably supported by a plurality of wheels 82 and having a pulley connector 84 rigidly secured to the frame platform 80. A generally semi-circular race platform 86 is secured on platform 80 to provide a sliding surface for the underside of the linkages 42, 42a of the HHV 38.

Thus, when it is necessary to correct slacking condition in HHV 38, longitudinal movement of 180° turn vehicle 30 is effected by means of winch 64 and cable connection 70, and in response to such movement the HHV 38 is able to move around the race platform 86 during repositioning and correction of tautness or slack in the HHV 38. The race platform 86 is disposed at an angle for the purpose of lifting the HHV wheels 40 up from ground contact during its traverse around the 180° turn vehicle 30, and sliding contact is made between the linkages 42, 42a and race platform 86. In addition, a series of rollers are disposed about the inner side (not shown) of race platform 86 in order to facilitate sliding movement therearound, such structure being clearly disclosed in the aforementioned U.S. patent application Ser. No. 463,222.

Ultimately the HHV 38 is connected to a suitable booster pump station 32 in accordance with prior practice in order to provide the additional pump power for moving slurry via slurry pipeline 34 on through tunnel 10 to additional booster stages or the ultimate preprocessing plant. A terminal box 90 is disposed at booster pump station 32 for interconnection of control link 48 as well as any proximate conductors 92 which may be led in from auxiliary or remote force transducers 60.

Figure 4:
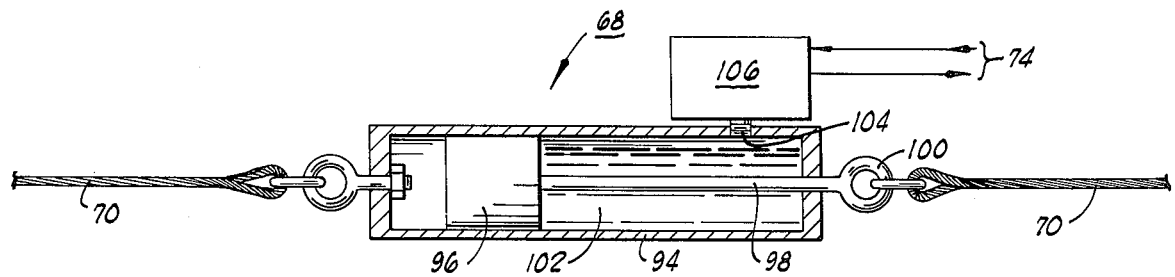
FIG. 4 is a vertical section and block representation of one form of force transducer which may be utilized in the present invention.

FIG. 4 illustrates the force transducer 68 in enlarged section to illustrate one type of tension responsive device suitable for use in the present invention. Thus, it includes a hydraulic cylinder 94 have a piston 96 and rod 98 extending into a rod end 100. Selected hdraulic fluid is placed within volume 102 and is in communication via an orifice 104 to a pressure responsive transducer 106 which functions to provide proportioning output electrical indication via conductors 74. Thus, any variation of the force transmitted along cable 70, which deviates from predetermined limits, will actuate pressure responsive transducer 106 and provide output indication via leads 74. A similar type of force transducer 68 may also be used for the like function at one or more remote transducers 60. One commercially available type of transducer 68 is the Model E11GH "Pressure Transmitter" available from the Foxboro Company of Foxboro, Massachusetts.

Figure 5:
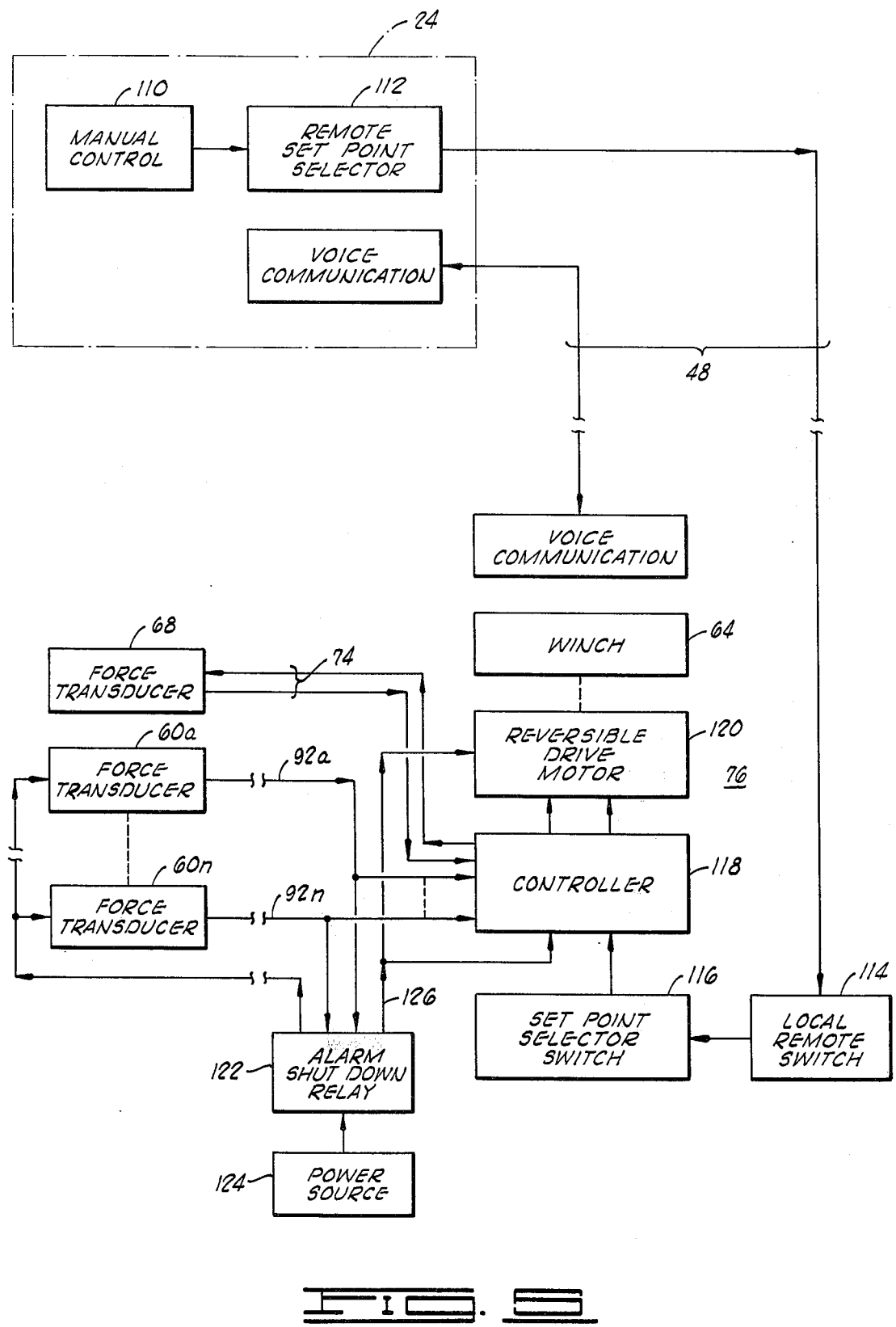
FIG. 5 is a block diagram of an automatic control system constructed in accordance with the present invention.

FIG. 5 is a block diagram of the control system as utilized in the present automatic coal mining operation. Essentially, the function of the control system, and referring briefly to FIG. 1, is to provide complementary movement to the 180° turn vehicle 30 in response to any movement of the injection pump vehicle 22 and mining machine 20 as it works at mine face 18. This requires heavy duty sensing and moving equipment since the tension in the hydraulic hose vehicle linkage may vary anywhere between 5,000 and 40,000 pounds during operation.

The primary operating position is at operator's console 24 which includes a manual control 110 in coaction with a remote set point selector 112 providing indication via link 48 to the control assembly 76. The remote set point selector 112 provides a current variable output which in normal operation is applied through a local remote switch 114 and set point selector switch 116 to provide set point current input to a controller 118, as will be further described. The manual control 110 is essentially an override control which can be actuated by the operator at mine face 18 in order to place maximum current at the set point input of controller 118 in event that a rapid retreat of the mining machinery is necessitated. The local remote switch 114 and set point selector switch 116 also enable an override function such that control can be effected from the winch platform 66 and control console 76 when it is desired.

The controller 118 is a conventional form of current controller which senses an input current, e.g. as input via conductors 74 from force transducer 68, and compares the input current to the set point current thereby to provide output to a reversible drive motor 120 in proper phase and polarity to effect operation of winch 64 in proper direction to bring about correction of the sensed input current. One form of current controller which is suitable for such usage in the Series 62H "Consotrol" controller which is commercially available from The Foxboro Company of Foxboro, Massachusetts.

The controller 118 includes a plurality of sense inputs and may also provide sense indication output in response to sense inputs via conductors 92a and 92n from respective remote force transducers 60a and 60n. A plurality of such force transducers 60a–60n may be employed throughout the mine system at various turn guides and other extrasensitive operating positions in order to provide alarm shutdown of all machinery and/or control of the reversible drive motor 120 and winch 64 to relieve or to increase tension in the HHV 38. Thus, sense outputs from force transducers 60a and 60n are applied to an alarm shutdown relay 122 in series with primary power source 124, and alarm relay 122 may be effective to cease operation of any selected components of the control system, mining machinery or whatever. Thus, alarm shutdown relay 122 may be placed in series with the primary power application via conductor 126 to each of controller 118 and the reversible drive motor 120 as well as ancillary control equipment providing primary control and power application to the mining machinery.

The force transducers 68 and 60a through 60n may each be of the type illustrated in FIG. 4, or they may be other commercially available types of strain gauge or tensometer having the requisite force characteristics. In any event, it is merely required that sense outputs from the force transducers 68, etc. provide a current output which is a direction function of the sensed load. Force transducer 68 merely senses tension of the HHV 38 in normal operating position to maintain tension within predetermined limits. The remote force transducers 60a through 60n serve more of a protective function in that, should a binding or mechanical breakdown occur along the HHV 38, then any sensed force magnitudes of unusually great or severe nature at the turn guides 28 and the like will effect shutdown of the equipment before further machinery harm can take place.

Voice communication may be supplied utilizing conventional audio equipment interconnected between operator's console 24 and control assembly 76 via link 48. It is contemplated that set point selector 112, or set point selector 116 when employed, will have the capability of mode selection to select one of several operating modes necessary for all control putposes of the automatic mining system. Such operating modes may include "advance", equatable to minimal HHV 38 tension, and thereby minimizing motive power requirements from the injection pump vehicle 22; a "retreat" setting which is equatable to a higher HHV 38 tension; and, yet another "emergency retreat" setting which is equatable to a very high HHV 38 tension and requiring highest speed correction.

It is also contemplated that one of the more recently developed minicomputers of commercially available type may be utilized in the mine area, e.g. mounted at the control assembly 76, and may provide the overall function of receiving all force transducer indications, and providing requisite outputs to the winch and drive system thereby to effect HHV tensioning, automatic shutdown, control override switching and the like. Any such minicomputer would, of course, function with suitable current control or relay circuitry effecting energization of such as reversible drive motor 120 and alarm shutdown relays 122.

It should be understood that while winch drive of 180° turn vehicle 30 is specifically shown, it is well within contemplation that the turn vehicle 30 may take the form of a self-powered vehicle moving on endless tracks or rails and that similar automatic drive control may be effected in response to sensing of tension in the HHV. In this even tension may be sensed between the HHV and the main platform of the turn vehicle with subsequent servo-controlled correction effected by re-positioning of the self-powered turn vehicle.

An extensible pipeline system, such as that illustrated in FIG. 1, is one of the critical components of a truly continuous hydraulic transport system. Ideally, a control system constructed in accordance with the present invention will provide constant tension in the HHV 38 for any given operating mode, thus providing more predictable operating conditions and, except for inspection and maintenance operations, the winch position will be unmanned thereby providing for safer operation on overall balance.

The present control system is designed so as to maintain tension in the HHV under all operating conditions. The magnitude of this tension is continuously monitored by a force transducer providing an output to be compared in current controller 118. Current controller 118 then compares the sensed input to one, two or more predetermined set point inputs thereto, each being equatable to a specific tension force in the HHV 38. The controller 118 functioning with drive motor 120 and winch 64 then serves to actuate the winch/wind or winch/unwind cable functions as required in order to maintain the observed HHV tension equal to that of the set point selected for observation at the given time.

Changes may be made in the combination and arrangement of the elements as heretofore set forth in the specification and shown in the drawings; it being understood that changes may be made in the embodiments disclosed without departing from the spirit and scope of the invention as defined in the following claims.

What is claimed is:

1. A control system for automatically maintaining proper alignment and tension in a flexible pipeline of the type which is mobilely supported and of relative large diameter for carrying slurried particulate matter, wherein a 180° loop is formed for movable adjustment of the effective length of the pipeline from source to a remote location, comprising;
 a mobile turn vehicle receiving said pipeline loop movably thereover;
 means for sensing the tension variation between the mobile turn vehicle and a selected stationary point and providing an electrical output indicative thereof; and
 control means responsive to said electrical output for effecting movement of said turn vehicle until the pipeline tension is adjusted to within predetermined limits.

2. A control system as set forth in claim 1 wherein said means for sensing comprises:

tensometer means connected between said turn vehicle and an external anchor position and generating a current output proportional to amount of sensed tension.

3. A control system as set forth in claim 1 wherein said control means comprises:
   winch means anchored at a position removed from said turn vehicle and extending a winch line in series with said means for sensing and connection to said turn vehicle;
   electrical power means receiving said control means electrical output to actuate reversibly said winch means thereby to effect movement of said turn vehicle.

4. A control system as set forth in claim 3 wherein said means for sensing comprises:
   tensometer means generating a current output proportional to amount of tension.

5. A control system as set forth in claim 1 wherein said control means comprises:
   current controller means energized by said sensing means electrical output to generate a drive output;
   electrical drive means reversibly energized by said drive output; and
   winch means anchored external to said turn vehicle and including a winch attached in series with said means for sensing to said turn vehicle, which winch means is actuated by said electrical drive means.

6. A control system as set forth in claim 1 wherein said means for sensing comprises:
   first tensometer means connected between the turn vehicle and an external anchor position and generating a current output proportional to amount of sensed tension; and
   additional tensometer means remotely disposed from the first tensometer means and sensing tension in said pipeline to provide output to said control means.

7. A control system as set forth in claim 6 wherein said additional tensometer means comprises:
   at least one tensometer connected between said pipeline and an external anchor position to provide current output proportional to the amount of sensed tension.

8. A control system as set forth in claim 7 which is further characterized to include:
   means receiving said current output from said at least one tensometer to effect alarm and shut down of said control means.

9. A control system for automatic mining apparatus of the type which includes a mining machine at the mine face in coaction with slurry injection apparatus and a mobile extensible pipeline slurry conduit extending to a remote location, comprising:
   a mobile 180° turn carrier having said conduit movably retained therearound;
   reversible drive means energizable to impart motive force to said mobile turn carrier;
   sensing means generating first and second outputs indicative of tension of said conduit in excess of predetermined upper and lower limits, respectively; and
   means receiving said first and second outputs that is effective to energize said reversible drive means for selected directional drive of said mobile turn carrier.

* * * * *